United States Patent
Han et al.

(10) Patent No.: US 10,592,165 B1
(45) Date of Patent: Mar. 17, 2020

(54) METHOD, APPARATUS AND COMPUTER PROGRAM PRODUCT FOR QUEUEING I/O REQUESTS ON MAPPED RAID

(71) Applicant: EMC IP Holding Company LLC, Hopkinton, MA (US)

(72) Inventors: Geng Han, Beijing (CN); Jibing Dong, Beijing (CN); Jian Gao, Beijing (CN); Xinlei Xu, Beijing (CN); Jamin Kang, Beijing (CN); Naizhong Chiu, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/886,950

(22) Filed: Feb. 2, 2018

(51) Int. Cl.
*G06F 12/00* (2006.01)
*G06F 3/06* (2006.01)

(52) U.S. Cl.
CPC .......... *G06F 3/0659* (2013.01); *G06F 3/0613* (2013.01); *G06F 3/0689* (2013.01)

(58) Field of Classification Search
CPC ..... G06F 3/0659; G06F 3/0613; G06F 3/0689
See application file for complete search history.

(56) References Cited

U.S. PATENT DOCUMENTS

| 2008/0005612 | A1* | 1/2008 | Arai | G06F 11/1084 714/6.12 |
| 2015/0169021 | A1* | 6/2015 | Salessi | G06F 1/266 713/300 |
| 2016/0202909 | A1* | 7/2016 | Nguyen Tien | G06F 3/061 711/103 |

* cited by examiner

*Primary Examiner* — Shawn X Gu
(74) *Attorney, Agent, or Firm* — Krishnendu Gupta; Nikhil Patel

(57) ABSTRACT

There is disclosed techniques for queuing I/O requests on Mapped RAID. The techniques comprising queuing a pending I/O request in a queue. The techniques also comprising determining that sufficient credits are available to enable a number of storage devices of a plurality of storage devices in a Mapped RAID group to process the pending I/O request. The techniques further comprising processing the pending I/O request upon determining that there is sufficient credits.

18 Claims, 13 Drawing Sheets

METHOD, APPARATUS AND COMPUTER PROGRAM PRODUCT FOR QUEUEING I/O REQUESTS ON MAPPED RAID

TECHNICAL FIELD

The present invention relates to data storage. More particularly, the present invention relates to a method, an apparatus and a computer program product for queueing I/O requests on mapped RAID.

BACKGROUND OF THE INVENTION

Generally, with the increasing amounts of information being stored, it may be beneficial to efficiently store and manage that information. While there may be numerous techniques for storing and managing information, each technique may have tradeoffs between reliability and efficiency.

SUMMARY OF THE INVENTION

There is disclosed a method, comprising: queuing a pending I/O request in a queue; determining that sufficient credits are available to enable a number of storage devices of a plurality of storage devices in a Mapped RAID group to process the pending I/O request; and processing the pending I/O request upon determining that there is sufficient credits.

There is also disclosed an apparatus, comprising: memory; and processing circuitry coupled to the memory, the memory storing instructions which, when executed by the processing circuitry, cause the processing circuitry to: queue a pending I/O request in a queue; determine that sufficient credits are available to enable a number of storage devices of a plurality of storage devices in a Mapped RAID group to process the pending I/O request; and process the pending I/O request upon determining that there is sufficient credits.

There is also disclosed a computer program product having a non-transitory computer readable medium which stores a set of instructions, the set of instructions, when carried out by processing circuitry, causing the processing circuitry to perform a method of: queuing a pending I/O request in a queue; determining that sufficient credits are available to enable a number of storage devices of a plurality of storage devices in a Mapped RAID group to process the pending I/O request; and processing the pending I/O request upon determining that there is sufficient credits.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
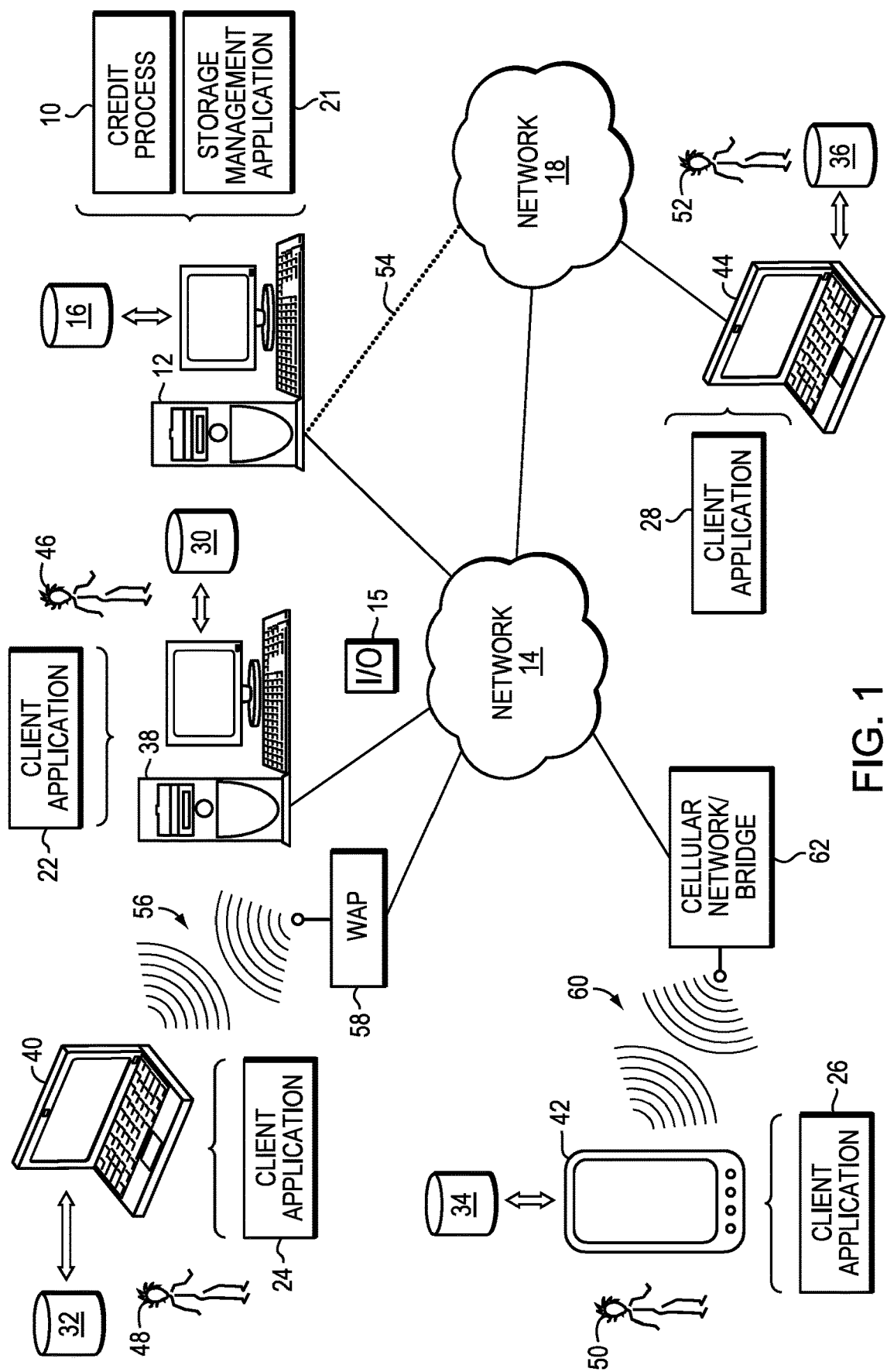
FIG. 1 is an example diagrammatic view of a credit process coupled to an example distributed computing network according to one or more example implementations of the disclosure.

System Overview:

In some implementations, the present disclosure may be embodied as a method, system, apparatus or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown credit process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a credit process, such as credit process 10 of FIG. 1, may receive, by a computing device, a I/O request (e.g., I/O request 15) for data. A number of storage devices of a plurality of storage devices in a Mapped RAID group that will be used to process the I/O request may be determined. It may be determined whether each storage device of the number of storage devices in the Mapped RAID group that will be used to process the I/O request has a respective threshold number of credits to process the I/O request. If each storage device of the number of storage devices in the Mapped RAID group that will be used to process the I/O request has the respective threshold number of credits, the I/O request may be processed. If at least one storage device of the number of storage devices in the Mapped RAID group that will be used to process the I/O request lacks the respective threshold number of credits, the I/O request may be queued.

In some implementations, the instruction sets and subroutines of credit process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, credit process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, credit process 10 and/or storage management application 21 may be accessed via one or more of client applications 22, 24, 26, 28. In some implementations, credit process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within credit process 10, a component of credit process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of credit process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/ data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS 8, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of credit process 10 (and vice versa). Accordingly, in some implementations, credit process 10 may be a purely server-side application, a purely client-side application, or a hybrid server-side/client-side application that is cooperatively executed by one or more of client applications 22, 24, 26, 28 and/or credit process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, credit process 10, and storage management application 21, taken singly or in any combination, may effectuate some or all of the same functionality, any description of effectuating such functionality via one or more of client applications 22, 24, 26, 28, credit process 10, storage management application 21, or combination thereof, and any described interaction(s) between one or more of client applications 22, 24, 26, 28, credit process 10, storage management application 21, or combination thereof to effectuate such functionality, should be taken as an example only and not to limit the scope of the disclosure.

In some implementations, one or more of users 46, 48, 50, 52 may access computer 12 and credit process 10 (e.g., using one or more of client electronic devices 38, 40, 42, 44) directly through network 14 or through secondary network 18. Further, computer 12 may be connected to network 14 through secondary network 18, as illustrated with phantom link line 54. Credit process 10 may include one or more user interfaces, such as browsers and textual or graphical user interfaces, through which users 46, 48, 50, 52 may access credit process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
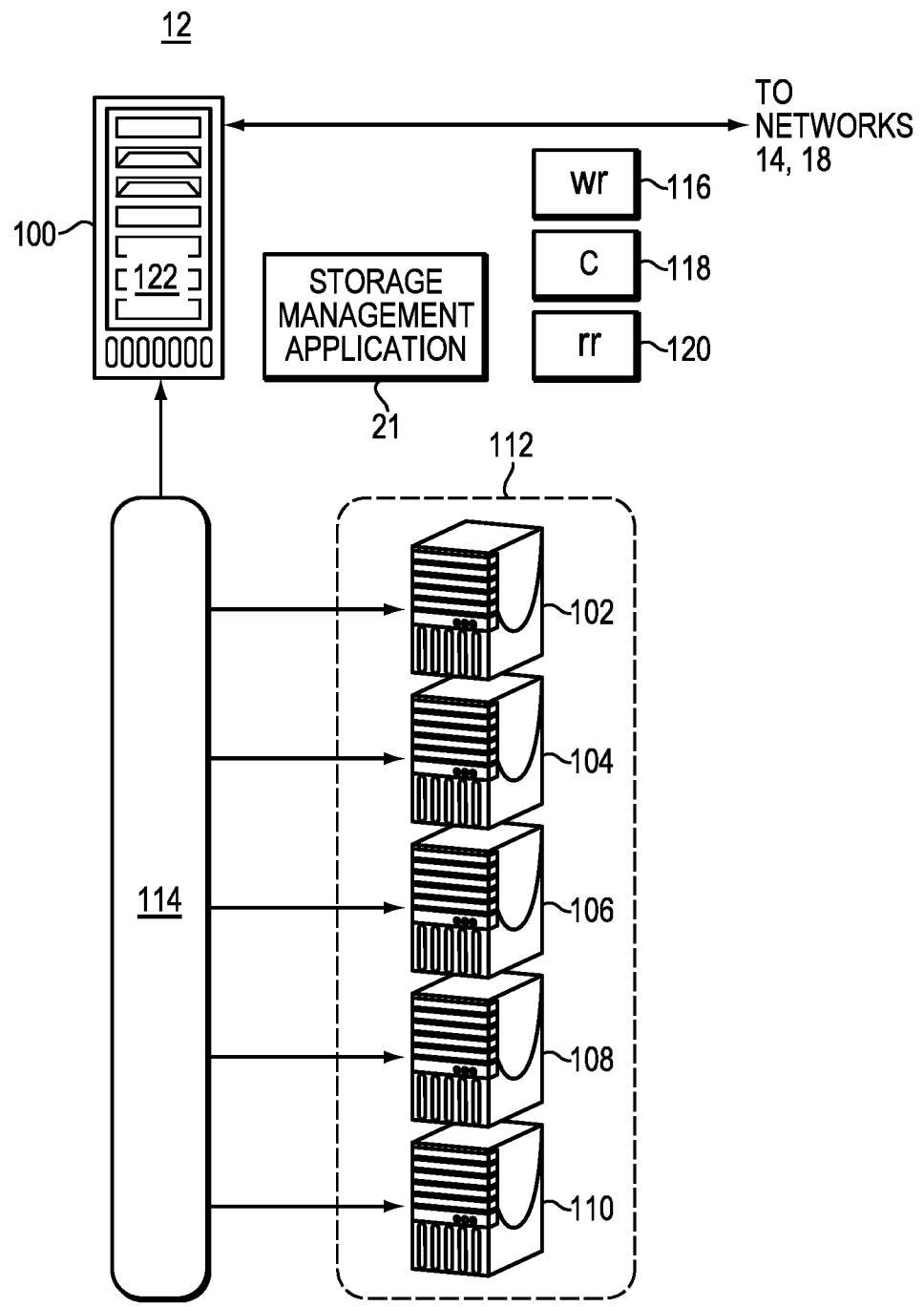
FIG. 2 is an example diagrammatic view of a computer of FIG. 1 according to one or more example implementations of the disclosure.
Figure 3:
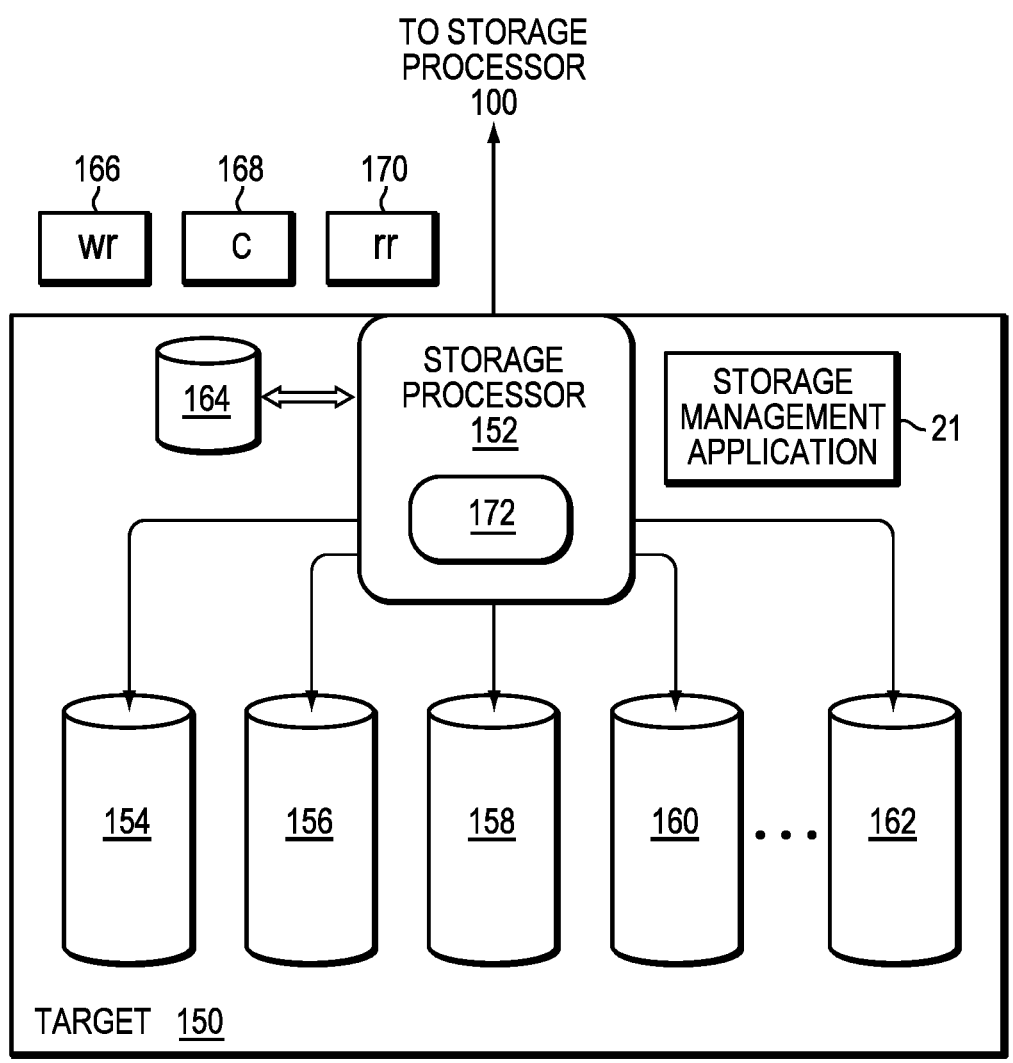
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or credit process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
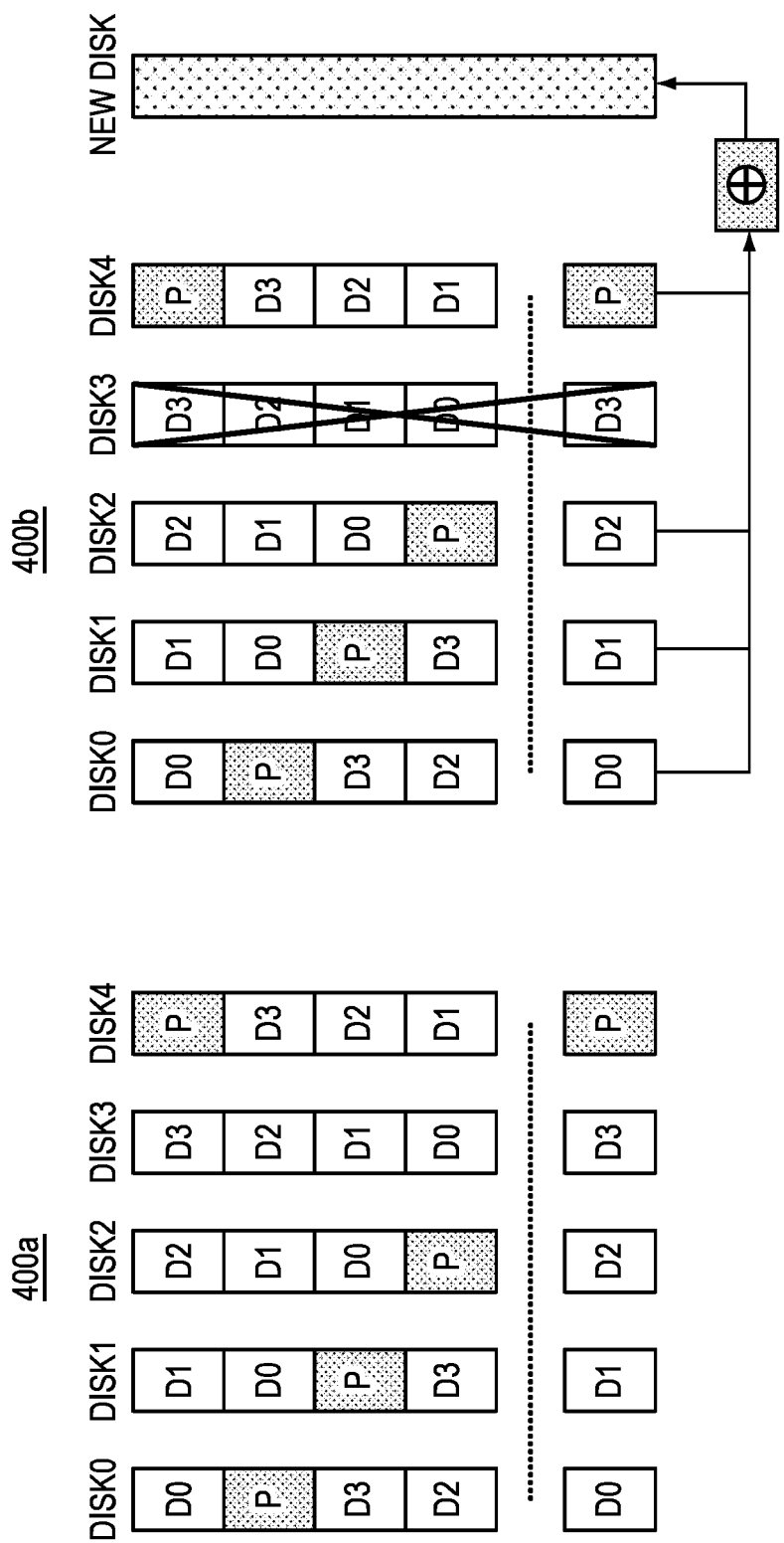
FIG. 4 is an example diagrammatic view of a RAID layout of FIG. 1 according to one or more example implementations of the disclosure.

Example RAID Group:

As discussed above, and referring at least to the example implementation of FIG. 4, an example 4D+1P RAID 5 layout 400a that may be managed (e.g., via storage management application 21) is shown. In the example, data may be distributed across the storage devices (e.g., drives) in one of several ways, referred to as RAID levels, depending on the required level of redundancy and performance. As noted above, while one or more of the figures may shows disks as the storage device, it will be appreciated that any of the storage devices discussed throughout may be used.

Shown for example purposes only, RAID 5 may consist of block level striping with distributed parity. Parity information may be distributed among the drives. In the above example, each stripe may consist of five blocks, which may include four data blocks (e.g., D0, D1, D2, D3) and one parity block (e.g., P). Upon failure of a single drive, subsequent reads may be calculated from the distributed parity such that no data is lost. At the same time, a "hot spare" storage device may be selected to replace the dead storage device, and all the data on the failed drive may be rebuilt and written to the new drive. For instance, and referring at least to the example implementation of FIG. 4, an example RAID 5 rebuild 400b of the example 4D+1P RAID 5 layout of 400a is shown.

As storage device capacity increases, the rebuild time may also increase. As a result, there may be an increased risk of a double storage device failure, which may lead to data loss. It will be appreciated that the rebuild time may be subject to the write bandwidth of the hot spare storage device, which may become a bottleneck. In some situations, it may be difficult to reduce the rebuild time for RAID. In some implementations, Mapped RAID technology have help resolve this issue.

Figure 5:
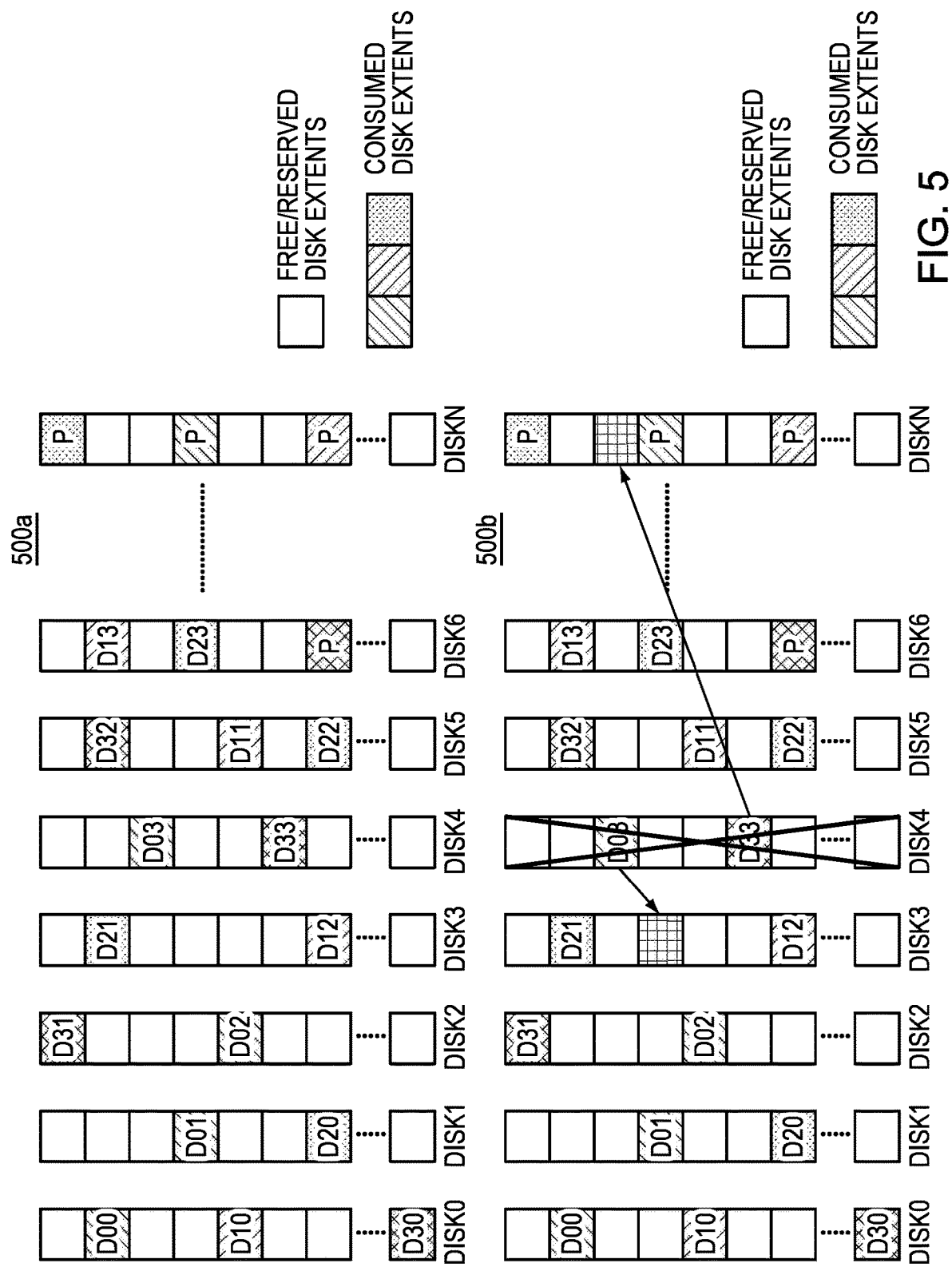
FIG. 5 is an example diagrammatic view of a Mapped RAID extent layout of FIG. 1 according to one or more example implementations of the disclosure.

Example Mapped RAID Group:

In some implementations, and referring at least to the example implementation of FIG. 5, an example Mapped RAID extent layout 500a managed (e.g., via storage management application 21) is shown (e.g., a 4D+1P RAID 5 over N disks, where N is greater than 5). Generally, Mapped RAID may be created on top of a disk (or other storage device) pool, which may include N disks (or other storage devices). Broadly speaking, each disk may be viewed as a set of continuous, non-overlapping, fixed sized disk extents. In the example of FIG. 5, while creating a RAID extent, 5 disk extents may be selected from 5 different disks. Some disk extents on each disk may be reserved as hot spare disk extents (e.g., instead of reserving the whole disk as a hot spare disk, which may be typical with a traditional RAID group).

Generally, it may be expected that storage management application 21 may evenly distribute the RAID extents to all disks in the pool, and further expected that all disk space is consumed no matter whether their capacity is the same or not. Typically, when one disk fails, the replacement may be found from other live disks for each disk extent on the dead drive. For instance, and referring at least to the example implementation of FIG. 5, an example disk extent replacement during disk fail in Mapped RAID layout 500b of the example Mapped RAID extent layout 500a is shown. Generally, an example limitation for the disk extents selection may be that there should be a guarantee that each RAID extent straddles 5 different disks (e.g., assuming the layout in FIG. 5). Moreover, storage management application 21 may be expected to distribute the dead disk extent replacements evenly to live disks.

Example RAID Extent Layout

In some implementations, one Mapped RAID group may be a set of ordered RAID extents. When creating a Mapped RAID group, storage management application 21 may need to allocate many RAID extents from the extent pool. As noted above, one RAID extent may need a RAID width number of disk extents from different disks in the extent pool. Generally, storage management application 21 may allocate the RAID extents one by one. For ease of explanation only, assume the disk number in the pool is N, and the RAID extent width is M. In the example, there should be $C_n^m$ possible ways to combine a RAID extent. A typical case may be for storage management application 21 to create 4D+1P mapped RAID 5 on top of 16 disks, where there are $C_{16}^5=4368$ ways to allocate a RAID extent on top of 16 disks. In some implementations, for each RAID extent allocation, storage management application 21 may loop over all the possible choices, and select the best one. In the example, the searching depth may be $C_n^m$.

Example Mapped RAID and Extent Pool Topology

Figure 6:
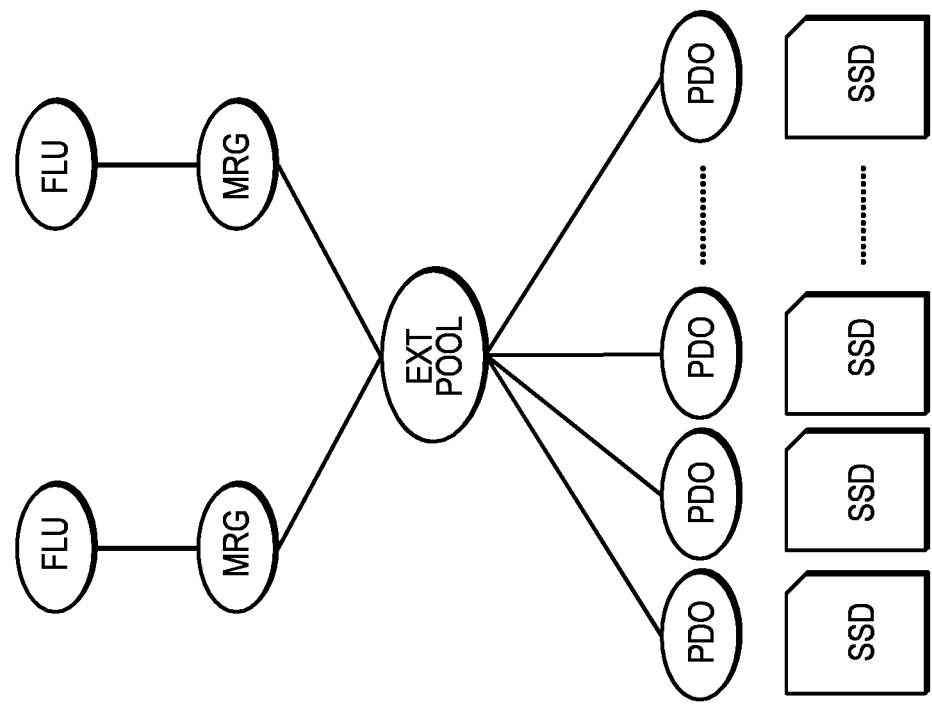
FIG. 6 is an example diagrammatic view of an example topology of Mapped RAID and Extent Pool according to one or more example implementations of the disclosure.
Figure 6:
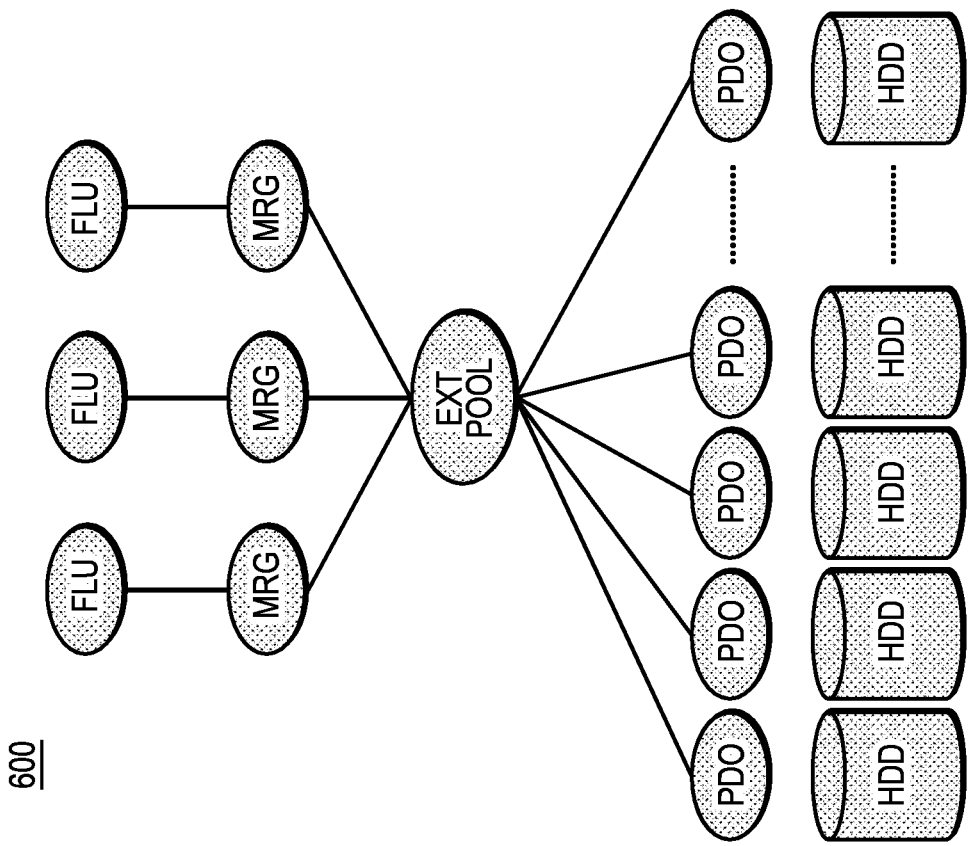

Referring at least to the example implementation of FIG. 6, an example topology 600 of Mapped RAID and Extent Pool is shown. In some implementations, the extent pool may support both SSDs and HDDs together. A physical drive object (PDO) may be used to describe each drive, which may include the drive type, sector size, and performance tier, etc. In the example, all drives in the extent pool should have the similar characteristic. In the extent pool, each disk may be split into a set of disk extents, where a number of disk extents may be selected and composed together and a Mapped RAID object may operate a RAID algorithm on them. Generally, each extent pool may, e.g., (1) include anywhere from a small number of drives to hundreds of drives (or more or less), (2) there may be more than one Mapped RAID object created on it, and they may share the same set of drives in the extent pool, and (3) each Mapped RAID object may expose their capacity to a multi-core cache (MCC) through a Flare LUN (FLU).

Mapped RAID Position in the I/O Stack

Figure 7:
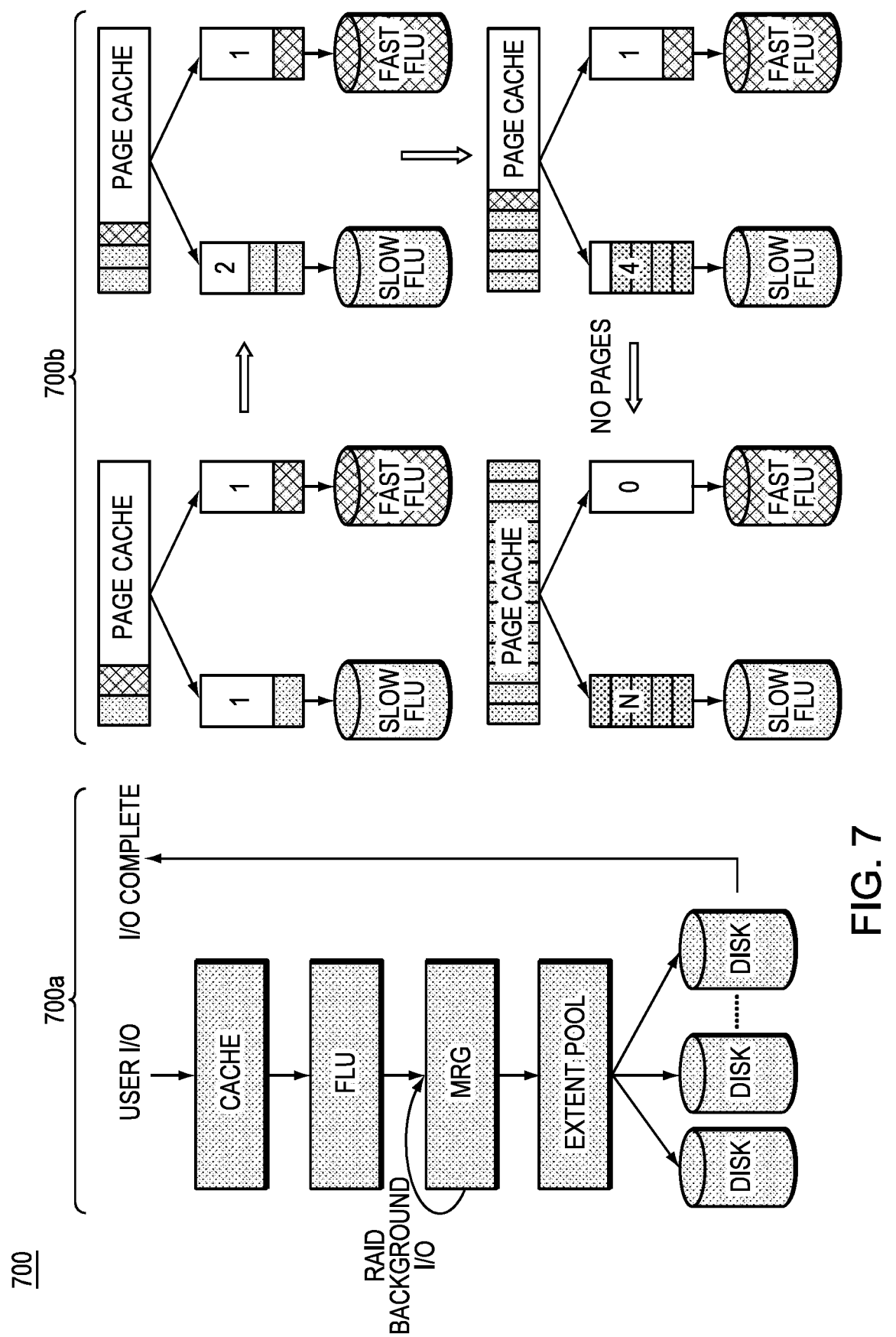
FIG. 7 is an example diagrammatic view of an example Mapped RAID position in an I/O stack and cache page starvation according to one or more example implementations of the disclosure.

Referring at least to the example implementation of FIG. 7, an example Mapped RAID position in an I/O stack 700a is shown. As noted above, Mapped RAID may be generally created on top of an extent pool, which is a collection of disks (or other storage device type). The space of Mapped RAID may be exposed to a multi-core cache (MCC) through a Flare LUN (FLU). MCC in the storage system may act as a buffer cache. Memory in the MCC may be organized into memory pages. A memory page may be, e.g., an 8 KB size. From the system perspective, a user I/O may first go to the MCC first. When a read I/O is sent to the MCC, the I/O may allocate memory pages in the MCC, and then send to the FLU, where Mapped RAID may break the I/O down to disk extents according to RAID geometry, and then the extent pool may forward the I/O to downstream disks. After the I/O is returned back, the user data may generally be said to have been read into memory pages. Generally, when a write I/O is sent to the MCC, the I/O data may be copied to the MCC's memory pages (or the memory may be allocated from the memory managed by the MCC, so data copy may be avoided), and then the write I/O may be completed. When some condition is met e.g., lack of free page or timer triggered, a background flush may be triggered. The MCC may flush dirty pages to the backend. The MCC may flush dirty pages sequentially in logical block address (LBA) increasing order. Thus, the MCC flush I/O pattern may be sequentially oriented. Generally, the host sends the 8K random write I/O to the MCC, and the MCC may reorganize these random host I/Os to sequentially flush the I/Os and send down to the FLU. The flush I/O may go through the software stack top and down just like the read I/O. This kind of behavior for the MCC's may require that the FLU and Mapped RAID should optimize sequential write I/O performance In addition to the user I/O, Mapped RAID may also generate internal I/Os while handling disk failure in a background service. If one of the drives fails, the extent pool may replace the broken disk extents with spares and notify the Mapped RAID to reconstruct the user data. In order to reduce the risk of data loss, Mapped RAID may rebuild several disk extents in parallel. During the rebuild, Mapped RAID may service the user I/O as well. RAID background services may also generate background I/O.

Referring at least to the example implementation of FIG. 7, an example cache page starvation on a fast FLU 700b is shown. In the example, from the I/O stack of Mapped RAID, all the user I/Os may be sent to the DRAM Cache first. The DRAM Cache space may be split into a bundle of pages. DRAM Cache may need to allocate the pages while processing the user I/O, and generally, these pages cannot be released until the dirty paged get flushed to disk.

In some implementations, the pages may be shared in system. While the user program accesses several FLUs in parallel, the user I/Os may compete with each other to get the free pages. Since the drives may have different performance levels, some FLUs may have better I/O performance than others, and the I/Os sent to the faster FLU may be completed earlier. All the user I/Os sent to the DRAM Cache may be running in parallel. While the slow and fast FLU service I/Os together, since the outstanding I/Os may be returned back later on the slower FLU, that FLU may hold the most cache pages. As a result, this may cause the user I/Os of the faster FLU to starve due to insufficient paged resources. Thus, there may be a need to solve this example issue and determine a mechanism to let the DRAM Cache work with Mapped RAID together.

Figure 8:
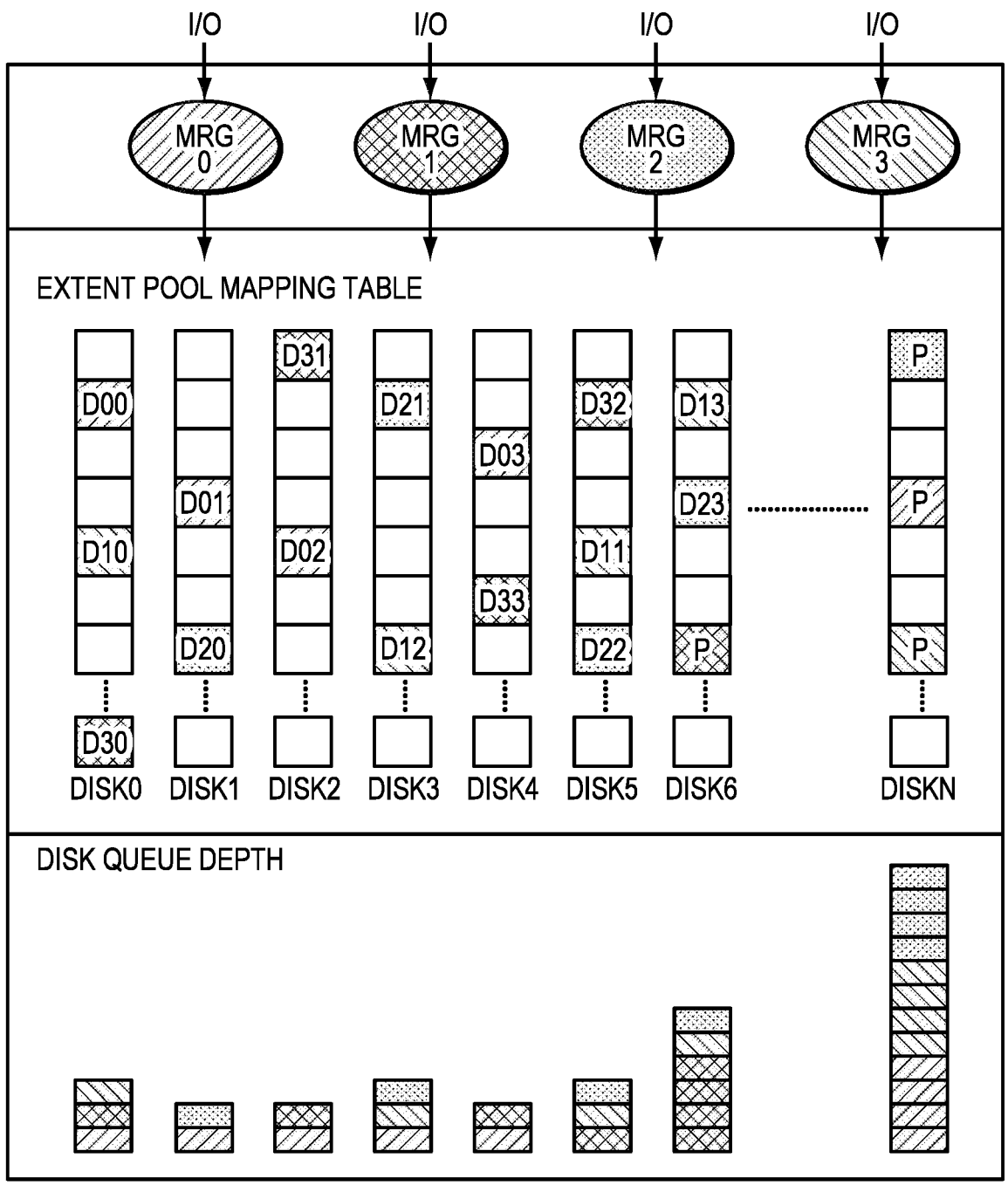
FIG. 8 is an example diagrammatic view of an example Mapped RAID group according to one or more example implementations of the disclosure.

Generally, there may be situations where the I/O load may be unbalanced, which may result in disk I/O starvation. For instance, in the extent pool, the I/O load of each drive may be different due to RAID extent layout and the user I/O pattern. Even if the drives have the same performance tier, and the disk extents are evenly distributed to all drives, the I/O load may still be unbalance among all drives. For instance, and referring to FIG. 8, an example and non-limiting Mapped RAID group 800 (illustrating disk I/O load during writes) is shown. In the example, there are four Mapped RAID groups (e.g., 4D+1P RAID 5 on one extent pool). In the example, assume for example purposes only that I/Os are issued to each Mapped RAID at the same time, where these I/Os will write each disk extent in that RAID extent once. It may be possible that due to RAID technology, the write I/Os may also update the parity disk extents. After writes break down to disks through mapping, each disk may have different I/O loads. The last disk N may need to service the most I/Os and the load of disks 1, 2, 4 are light.

As similarly discussed above regarding a slow FLU, the slowest disk may become the bottle neck of the whole extent pool. This may be due to, for example, (1) the pending I/Os on the slow disks may consume a lot of system resource (e.g., memory, lock, etc.), (2) the I/O response time of Mapped RAID may depend on the slowest drives (e.g., the response time may increase significantly once the drive is over loaded), and (3) the I/O load on each disk may unbalance, thus some disk(s) may be starved due to a lack of memory, etc.

Figure 9:
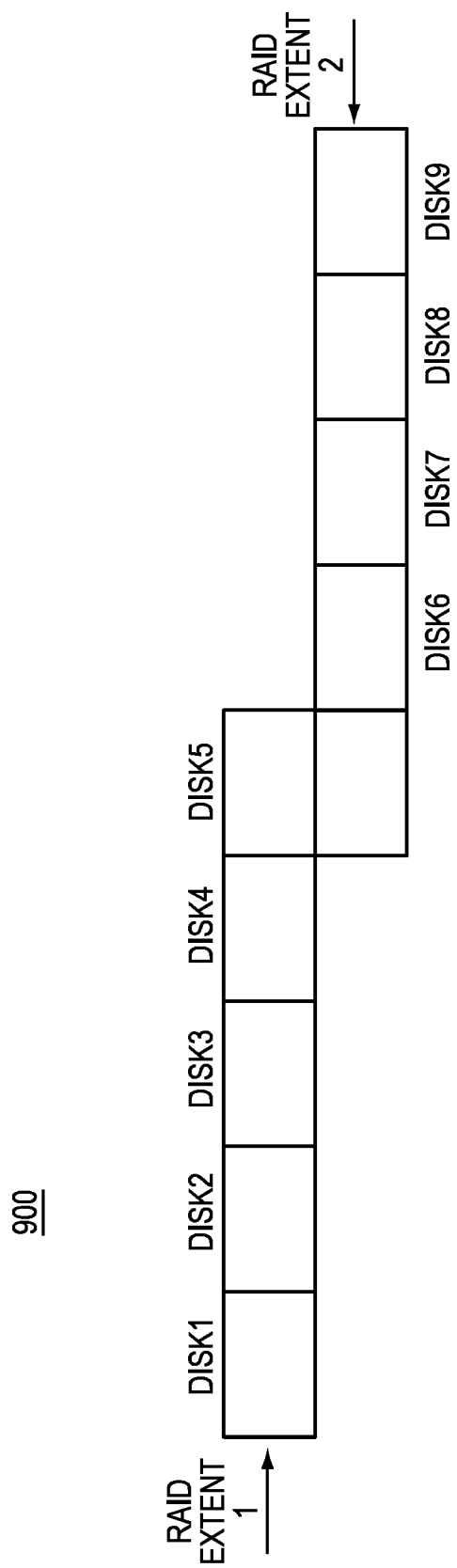
FIG. 9 is an example diagrammatic view of an example RAID extent according to one or more example implementations of the disclosure.
Figure 10:
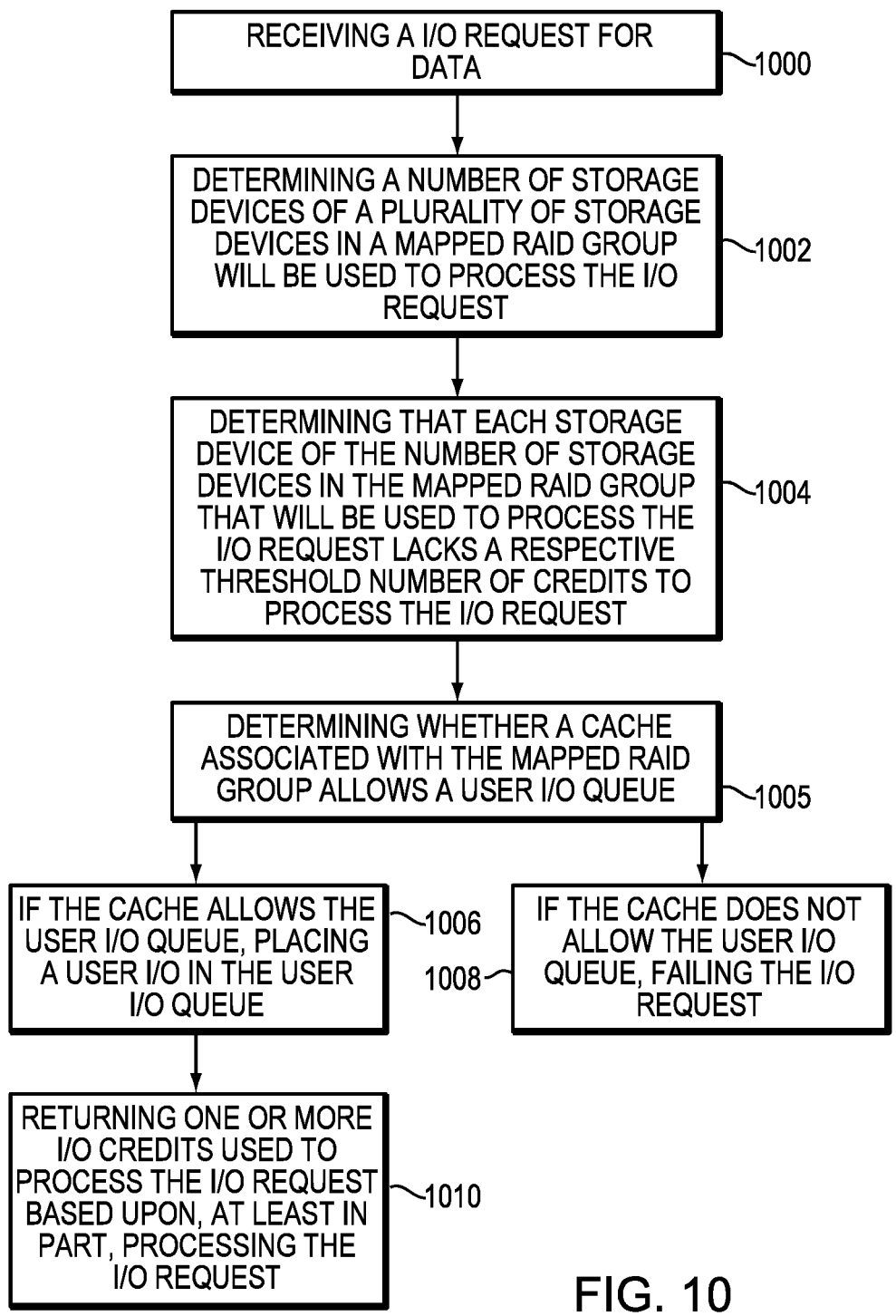
FIG. 10 is an example flowchart of a credit process according to one or more example implementations of the disclosure.

Another potential example that may introduce unbalanced disk I/O may be shown in the example RAID extents 900 of FIG. 9. In the example, there are a plurality (e.g., two) "hot" RAID extents. These two RAID extents may have an overlap on disk five, which may mean that both RAID extents (RAID extent 1 and RAID extent 2) allocate one disk extent on disk five. Thus, in this example case, the I/O workload on disk five may be heavier than other disks. Moreover, if one disk is severely overloaded, the I/O response time on that disk may be dramatically increased. In other words, the disk will become "slow". A slow disk may severely reduce the overall extent pool I/O performance.

As will be discussed below, credit process 10 may at least help, e.g., the improvement of an existing storage technology, necessarily rooted in computer technology in order to overcome an example and non-limiting problem specifically arising in the realm of data storage. For instance, credit process 10 may use an efficient process to improve extent pool I/O performance on Mapped RAID.

The Credit Process:

As discussed above and referring also at least to the example implementations of FIGS. 10-13, credit process 10 may receive 1000, by a computing device, a I/O request for data. Credit process 10 may determine 1002 a number of storage devices of a plurality of storage devices in a Mapped RAID group that will be used to process the I/O request. Credit process 10 may determine 1004 that each storage device of the number of storage devices in the Mapped RAID group that will be used to process the I/O request lacks a respective threshold number of credits to process the I/O request. Credit process 10 may determine 1005 whether a cache associated with the Mapped RAID group allows a user I/O queue. If the cache allows the user I/O queue, credit process 10 may place 1006 a user I/O in the user I/O queue. If the cache does not allow the user I/O queue, credit process 10 may fail 1008 the I/O request.

Figure 11:
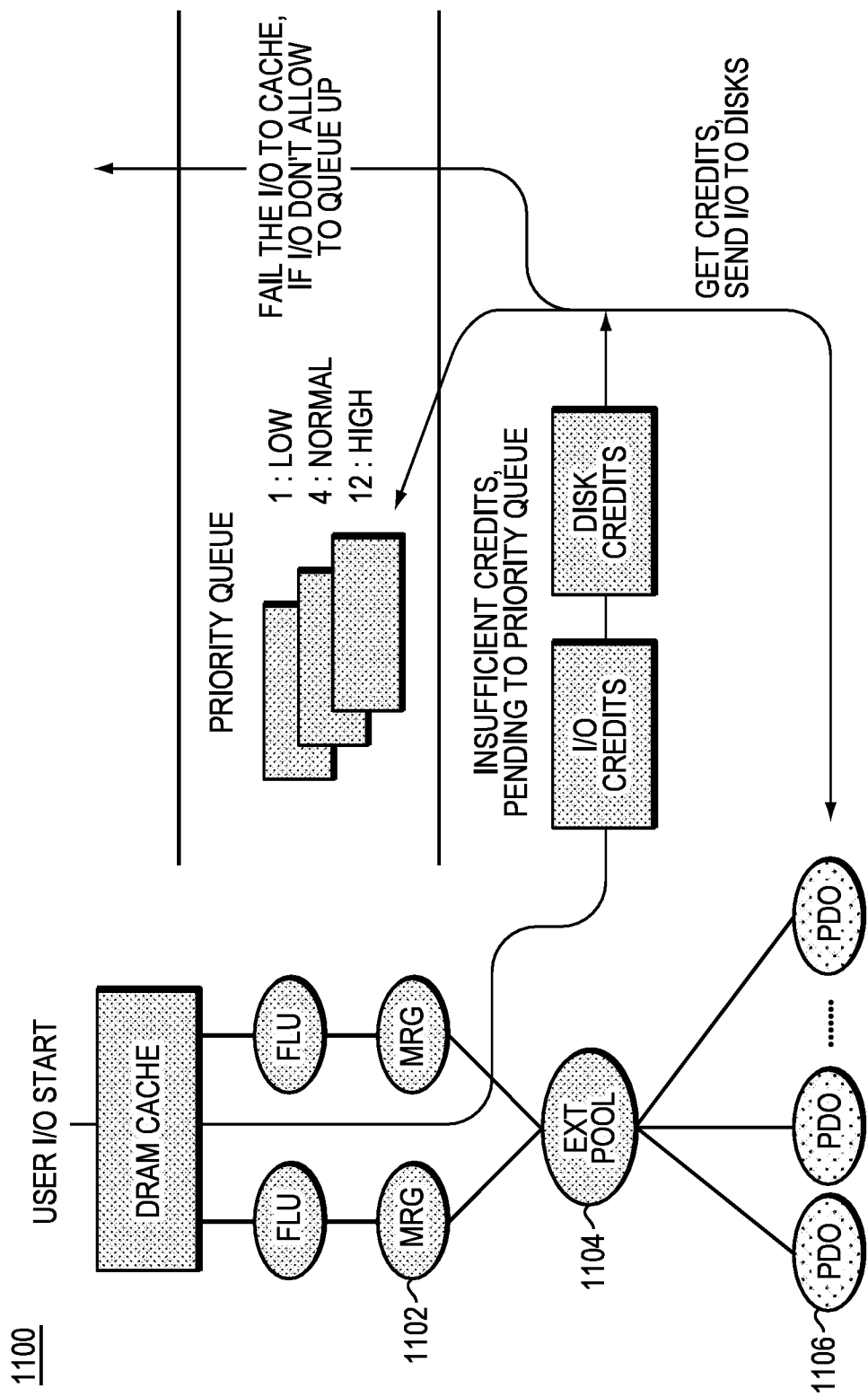
FIG. 11 is an example diagrammatic view of an example credits mechanism according to one or more example implementations of the disclosure.
Figure 12:
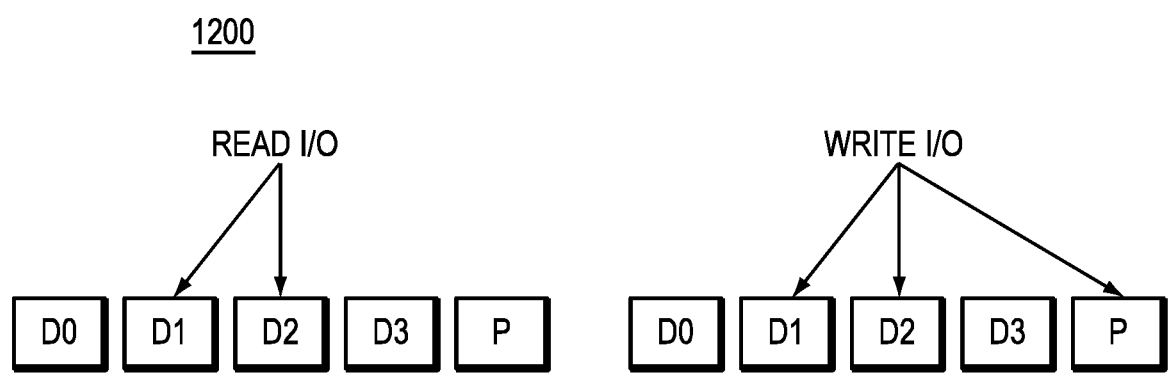
FIG. 12 is an example diagrammatic view of an example I/O layout according to one or more example implementations of the disclosure.

In some implementations, and referring at least to the example implementation of FIG. 11, an example credits mechanism 1100 is shown. In the example, there is shown a Mapped Raid Group level (e.g., MRG 1102), an extent pool level (e.g., Ext Pool 1104), and a Physical Drive Object level (e.g., PDO 1106). Further in the example, Ext Pool 1104 level may include User I/O credits and Background I/O credits, and PDO 1106 level may include disk I/O credits. As will be discussed below, for each I/O received, credit process 10 may first take the I/O credits on the Ext pool 1104 level, and then take the disk I/O credits on the PDO 1106 level. The disk I/O credits may help prevent the slow disks of the extent pool from getting overloaded, and may also help avoid slow disks absorbing too many I/Os that may drag down the whole RAID response time. As noted above, the I/O load of each disk (e.g., HDD or SSD, etc.) may be different due to the user I/O pattern. The disk with the heavier load may need more time to process I/Os; however, the disk with the smaller load may finish processing the I/Os in a shorter period of time. With a continuous heavy I/O load, more and more I/Os may be waiting to be processed on the slower disk(s), and in contrast, the I/Os waiting to be processed on the faster disk(s) may become fewer and fewer. This situation may remain until the total I/O credits are exhausted.

In some implementations, credit process 10 may receive 1000, by a computing device, an I/O request for data. For instance, assume for example purposes only that a user (e.g., user 46) is requesting some form of data request (e.g., read or write). In the example, user 46 (via computing device 36) may send an I/O request (e.g., I/O 15) for data (e.g., stored in storage target 150). In the example, I/O 15 may be received 1000 by credit process 10.

In some implementations, credit process 10 may determine 1002 a number of storage devices of a plurality of storage devices in a Mapped RAID group that will be used to process the I/O request. For example, Mapped RAID (e.g., via credit process 10) may be responsible for breaking down I/O 15 to some disk I/O, leveraging the RAID algorithm and RAID extent mapping. As will be appreciated, different RAID types may have different data layout algorithms. For example, mirror RAID may save one copy of data on each disk, but parity RAID may use some disks to save, e.g., user data and one (e.g., RAID 5) or two (e.g., RAID 6) disks to save parity data, where the parity data may be rotated among the associated disks. For Mapped RAID, credit process 10 may leverage both the RAID algorithm and the associated saved mapping table, since, e.g., credit process 10 may need to have knowledge of where its disk extents for each RAID extent are allocated and from which disks. Using the Mapped RAID object, credit process 10 may be able to break down the received 1000 I/O to the disk I/Os, to determine 1002 how many storage devices in the Mapped RAID group will be used to process I/O 15.

An example of this will be discussed below for a RAID 5 implementation, however, it will be appreciated that other RAID implementations may also be used without departing from the scope of the disclosure. With the example RAID 5 implementation, and referring at least to the example I/O layout 1200 of FIG. 12, assume for example purposes only that there is a 4+1 RAID 5 set up. In the example, should I/O 15 be a read I/O, credit process 10 may determine 1002 that two disks in the Mapped RAID group will be involved (i.e., "touched") for processing the read I/O (e.g., data disks D1 and D2). As a result, the associated I/O credits in this example may be two. As another example, should I/O 15 be a write I/O, credit process 10 may determine 1002 that three disks in the Mapped RAID group will be involved (i.e., "touched") for processing the write I/O (e.g., data disks D1 and D2, and also a parity disk P since for a write I/O, credit process 10 may update the parity). As a result, the associated I/O credit in this example may be three.

Credit process 10 may determine 1004 that each storage device of the number of storage devices in the Mapped RAID group that will be used to process the I/O request lacks a respective threshold number of credits to process the I/O request. For instance, in some implementations, the threshold number of credits may include at least one of a number of user I/O credits in an extent pool and a number of background I/O credits in the extent pool. For example, for any I/O (including I/O 15), credit process 10 may take two kinds of I/O credits (e.g., first taking the credits on Ext pool 1104 level, where read/write user I/O may take user I/O credits and Background I/O (e.g., rebuild, verify, copy) may take Background I/O credits).

In some implementations, when determining the respective threshold number of credits to process the I/O request exists, an initial storage device credit for a first type of storage device of the plurality of storage devices may be X, where the first type of storage device of the plurality of storage devices may be a hard disk drive, and an initial storage device credit for a second type of storage device of the plurality of storage devices may be Y, where the second type of storage device of the plurality of storage devices may be a flash drive. In the example, for each disk in the extent pool, credit process 10 may initiate the disk credits per the example function below:

For a HDD (e.g., spindle drive), initial credits X may include, e.g.: Initial disk credits=I/O credits per disk*2
For a SDD (e.g., flash drive), initial credits Y may include, e.g.: Initial disk credits=I/O credits per disk*8.

That is, the initial disk credits may be N times the I/O credits per disks, where for a HDD, N may be two, and for SDD, N may be eight. However, it will be appreciated that N may be more or less without departing from the scope of the disclosure. For each user I/O, the associated RAID object (e.g., via credit process 10) may calculate which disk position I/O 15 may access and request the disk credits together with I/O credits. In the example, "I/O credits per disk" may represent how many I/Os the disk may process in parallel. In some implementations, such an attribute may be obtained from PDO 1106. Thus, for HDD, credit process may set the disk credits to two times the I/O credits per disk, and for SSD, credit process may set the disk credits to eight times the I/O credits per disk.

In some implementations, if each storage device of the number of storage devices in the Mapped RAID group that will be used to process the I/O request has the respective threshold number of credits, credit process 10 may process the I/O request. For instance, assume for example purposes only that each of the disks in the Mapped RAID group that will be involved in processing I/O 15 currently has Z disk I/O credits. Further assume that the cost of each disk to process I/O 15 that will be involved in processing I/O 15 is Z−1. Thus, in the example, the threshold number of credits is determined 1004 by credit process 10 for each disk involved in processing I/O 15 to be Z−1. In the example, because each respective disk has at least the threshold number of credits required to process I/O 15 (e.g., Z−1), credit process 10 may process I/O 15.

In some implementations, if at least one storage device of the number of storage devices in the Mapped RAID group that will be used to process the I/O request lacks the respective threshold number of credits, credit process 10 may queue the I/O request. For instance, assume for example purposes only that D1 in the Mapped RAID group that will be involved in processing I/O 15 currently has Z+1 disk I/O credits, D2 in the Mapped RAID group that will be involved in processing I/O 15 currently has Z+1 disk I/O credits, and that P in the Mapped RAID group that will be involved in processing I/O 15 currently has Z disk I/O credits. Further assume that the cost of each disk to process I/O 15 that will be involved in processing I/O 15 is Z. Thus, in the example, the threshold number of credits is determined 1004 by credit process 10 to be Z. In the example, because D1 and D2 each have at least the threshold number of credits required to process I/O 15 (e.g., Z+1), but because P with Z disk I/O credits does not have at least the threshold number of credits required to process I/O 15 (e.g., Z+1), at least one disk in the Mapped RAID group (i.e., P) that will be involved in processing I/O 15 lacks at least the threshold number of credits required to process I/O 15, therefore credit process 10 may queue I/O 15. In some implementations, should credit process 10 determine later that the appropriate amount of credits is available, credit process 10 may then wake up and process I/O 15, and may again queue I/O 15 if there are still not enough credits.

In some implementations, credit process 10 may determine 1005 whether a cache associated with the Mapped RAID group allows a user I/O queue. If the cache allows the user I/O queue, credit process 10 may place 1006 a user I/O in the user I/O queue. If the cache does not allow the user I/O queue, credit process 10 may fail 1008 the I/O request. For instance, in addition to the I/O credits mechanism on the extent pool level, credit process 10 may also introduce disk I/O credits on the PDO level, which may be beneficial to have a two level credit system, since the I/O credits may only control the overall number of outstanding user I/Os. The user I/Os may break down to disk I/Os according to the RAID geometry and the RAID extent mapping. The traffic load of each disk may vary greatly, so before the extent pool credits are exhausted, some drives may already have been overloaded. In the example implementation, for each I/O, credit process 10 may first take the I/O credits on the extent pool level, and then may also take the credits for each disk it touches (as discussed above). For any I/O, mapper RAID and the extent pool (via credit process 10) may break it down to the disk I/Os. For each disk I/O, credit process 10 may take the credits from its associated disk touched. Only if all corresponding disks have enough credits, the I/O may be processed, otherwise it may be rejected or pending.

However, in some implementations, if the extent pool does not have enough credits (e.g., neither I/O credits nor disk credits), credit process 10 may have two additional choices. For instance, the DRAM Cache (via credit process 10) may set a flag on the user I/O to indicate whether credit process 10 may queue this I/O while Mapped RAID has insufficient credits. If the DRAM Cache allows I/O queueing, credit process 10 may place 1006 the user I/O into the user I/O priority queue. If the DRAM Cache does not allow I/O queueing, credit process 10 may fail 1008 the user I/O with an alter status to the DRAM Cache.

In some implementations, credit process 10 may return 1010 one or more I/O credits used to process I/O 15 request based upon, at least in part, processing the I/O request. For example, once I/O 15 has been processed and completed, credit process 10 may return some or all of the disk I/O credits to the respective disks used to process I/O 15, by, e.g., decreasing the corresponding disk I/O credits used to process I/O 15. In some implementations, returning 1010 the I/O credits may include returning some or all of the corresponding Ext pool I/O credits, by, e.g., decreasing the corresponding user I/O credits and/or background I/O credits used to process I/O 15. In some implementations, the user I/O credits may be returned 1010 to the user I/O credits maintained on the extent pool level, and the Background I/O credits may be return 1010 to the Background I/O credits maintained on the extent pool level. Both user I/O and Background I/O may return disk I/O credits back to corresponding disks (according to the I/O breaking down result). In some implementations, credit process 10 may check if there are any user I/Os pending in the I/O priority queue, credit process 10 may wake up the pending I/Os in the priority queue (e.g., restart the I/O in the queue), and attempt to complete processing of that I/O, and return to the DRAM Cache.

As discussed above, if there is insufficient IO credits and/or disk credits, Mapped RAID may queue the incoming I/Os to the priority queue. In this particular embodiment, it should be understood that the priority queue defines a multi-priority queue such that different priority I/O can get different servicing priorities. For example, the multi-priority queue may have 3 priority queue levels (i.e., low, normal and high) and I/O will be put into one of the levels according to its priority. In at least one embodiment, when outstanding I/O complete, and credits are returned, the pending I/O may restart in accordance with the following rules:

a. The pending I/Os get rescheduled cycle by cycle. In each reschedule cycle, Mapped RAID will reschedule 12 high priority I/O, 4 normal priority I/O and 1 low priority I/O.

b. The I/Os with the same priority in queue will reschedule in FIFO—First in First out.

Advantageously, these rules may ensure that the high priority I/O may be restarted more frequency than lower priority I/O but that the lower priority I/O may never be starved for ever.

Figure 13:
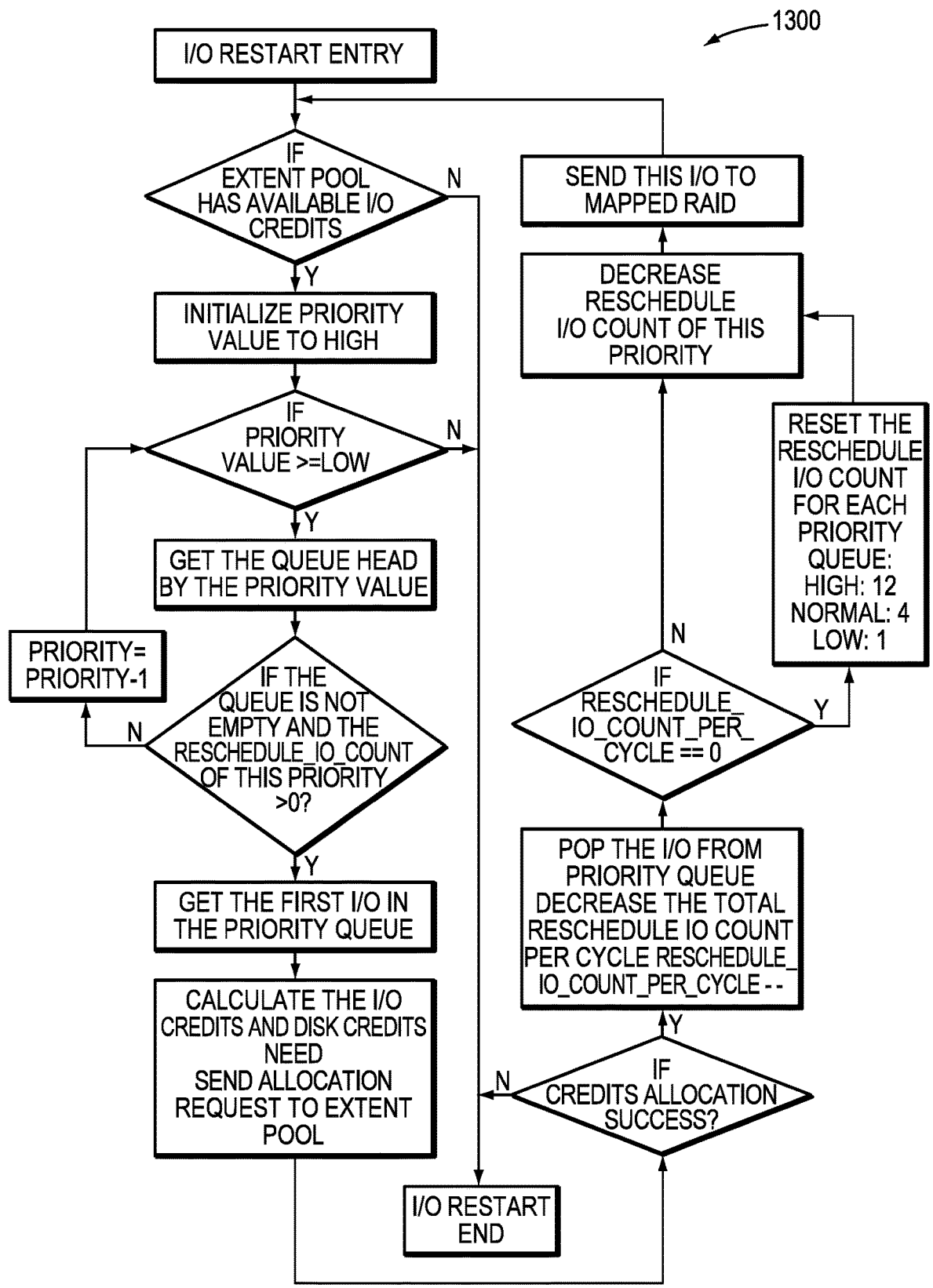
FIG. 13 is an example flowchart of an example process for waking up pending I/O requests in a queue according to one or more example implementations of the disclosure.

As discussed above and referring also at least to the example implementation of FIG. 13, a process 1300 describes how to wake up the pending I/O in a queue such as the multi-priority queue. The process 1300 describes the following:

1. When the I/O complete and the I/O credits return to Mapped RAID.
2. Check if we have available I/O credits, if no, go to step 12.
3. Loop over the Mapped RAID priority queues from high to low. If the last queue processed, go to step 12.
4. Check if the priority queue has pending I/O in queue and the reschedule I/O count of this priority is not zero. If yes, that means there is pending I/O is able to be restarted in this priority queue. If no, check the next priority queue, go to step 3.
5. Get the first I/O in the priority queue.
6. Calculate the I/O credits and disk credits needed for this I/O, send the allocation request to extent pool.
7. If the allocation of credits successful, pop the I/O from priority queue, decrease the total reschedule I/O count of this cycle. Otherwise go to step 12.
8. Check if total reschedule I/O count of this cycle is 0. If yes, we need to reset the reschedule I/O count for each priority, so do the total reschedule I/O count.

9. Otherwise, decrease the reschedule I/O count of this priority.
10. Send this I/O to Mapped RAID.
11. Go to step 2 to check if we are able to wake up more pending I/Os.
12. I/O restart end.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method, comprising:
   queuing a pending input/output (I/O) request in a queue;
   determining that sufficient credits are available to enable a number of storage devices of a plurality of storage devices in a Mapped redundant array of independent disks (RAID) group to process the pending I/O request, wherein the Mapped RAID group comprises one or more RAID extents, each RAID extent containing a respective set of device extents allocated to that RAID extent, each device extent supported by an extent of storage on a storage device of the plurality of storage devices, wherein credits include one or more of: user I/O credits, background I/O credits, and disk I/O credits;
   wherein each RAID extent includes an amount of user I/O credits corresponding to each extent's ability to handle the pending I/O request corresponding to one or more of read/write I/Os;
   wherein each RAID extent includes an amount of background I/O credits corresponding to each extent's ability to handle the pending I/O request corresponding to one or more of rebuild, verify, and copy I/Os;
   wherein each disk extent of the plurality of storage devices includes an amount of disk I/O credits corresponding to each disk's ability to handle the pending I/O request, each disk having an initial amount of disk I/O credits based on disk type; and
   processing the pending I/O request upon determining that there are sufficient credits.

2. The method as claimed in claim 1, wherein the queue comprises a multi-priority queue with respective priority levels in the multi-priority queue describing different levels of service with respect to processing of pending I/O requests.

3. The method as claimed in claim 2, wherein one of the priority levels in the multi-priority queue describes a higher level of service relative to another priority level in the multi-priority queue such that a pending I/O request in a higher priority level will be prioritized for processing over a pending I/O request in the other priority level.

4. The method as claimed in claim 2, wherein respective pending I/O requests in a priority level in the multi-priority queue will be selected for processing in accordance with a first-in first-out approach.

5. The method as claimed in claim 2, wherein each of the priority levels in the multi-priority queue include a count associated therewith relating to an amount of pending I/O requests to be processed before moving to a next priority level in the multi-priority queue.

6. The method as claimed in claim 5, wherein a count associated with a priority level in the multi-priority queue is higher relative to a count associated with another priority level in the multi-priority queue with a lower level of servicing.

7. An apparatus, comprising:
   memory; and
   processing circuitry coupled to the memory, the memory storing instructions which, when executed by the processing circuitry, cause the processing circuitry to:
   queue a pending input/output (I/O) request in a queue;
   determine that sufficient credits are available to enable a number of storage devices of a plurality of storage devices in a Mapped redundant array of independent disks (RAID) group to process the pending I/O request, wherein the Mapped RAID group comprises one or more RAID extents, each RAID extent containing a respective set of device extents allocated to that RAID extent, each device extent supported by an extent of storage on a storage device of the plurality of storage devices, wherein credits include one or more of: user I/O credits, background I/O credits, and disk I/O credits;
   wherein each RAID extent includes an amount of user I/O credits corresponding to each extent's ability to handle the pending I/O request corresponding to one or more of read/write I/Os;
   wherein each RAID extent includes an amount of background I/O credits corresponding to each extent's ability to handle the pending I/O request corresponding to one or more of rebuild, verify, and copy I/Os;
   wherein each disk of the plurality of storage devices includes an amount of disk I/O credits corresponding to each disk's ability to handle the pending I/O request, each disk having an initial amount of disk I/O credits based on disk type; and process the pending I/O request upon determining that there are sufficient credits.

8. The apparatus as claimed in claim 7, wherein the queue comprises a multi-priority queue with respective priority levels in the multi-priority queue describing different levels of service with respect to processing of pending I/O requests.

9. The apparatus as claimed in claim 8, wherein one of the priority levels in the multi-priority queue describes a higher level of service relative to another priority level in the multi-priority queue such that a pending I/O request in a higher priority level will be prioritized for processing over a pending I/O request in the other priority level.

10. The apparatus as claimed in claim 8, wherein respective pending I/O requests in a priority level in the multi-priority queue will be selected for processing in accordance with a first-in first-out approach.

11. The apparatus as claimed in claim 8, wherein each of the priority levels in the multi-priority queue include a count associated therewith relating to an amount of pending I/O requests to be processed before moving to a next priority level in the multi-priority queue.

12. The apparatus as claimed in claim 11, wherein a count associated with a priority level in the multi-priority queue is higher relative to a count associated with another priority level in the multi-priority queue with a lower level of servicing.

13. A computer program product having a non-transitory computer readable medium which stores a set of instructions, the set of instructions, when carried out by processing circuitry, causing the processing circuitry to perform a method of:

queuing a pending input/output (I/O) request in a queue;

determining that sufficient credits are available to enable a number of storage devices of a plurality of storage devices in a Mapped redundant array of independent disks (RAID) group to process the pending I/O request, wherein the Mapped RAID group comprises one or more RAID extents, each RAID extent containing a respective set of device extents allocated to that RAID extent, each device extent supported by an extent of storage on a storage device of the plurality of storage devices, wherein credits include one or more of: user I/O credits, background I/O credits, and disk I/O credits;

wherein each RAID extent includes an amount of user I/O credits corresponding to each extent's ability to handle the pending I/O request corresponding to one or more of read/write I/Os;

wherein each RAID extent includes an amount of background I/O credits corresponding to each extent's ability to handle the pending I/O request corresponding to one or more of rebuild, verify, and copy I/Os;

wherein each disk extent of the plurality of storage devices includes an amount of disk I/O credits corresponding to each disk's ability to handle the pending I/O request, each disk having an initial amount of disk I/O credits based on disk type; and processing the pending I/O request upon determining that there are sufficient credits.

14. The computer program product as claimed in claim 13, wherein the queue comprises a multi-priority queue with respective priority levels in the multi-priority queue describing different levels of service with respect to processing of pending I/O requests.

15. The computer program product as claimed in claim 14, wherein one of the priority levels in the multi-priority queue describes a higher level of service relative to another priority level in the multi-priority queue such that a pending I/O request in a higher priority level will be prioritized for processing over a pending I/O request in the other priority level.

16. The computer program product as claimed in claim 14, wherein respective pending I/O requests in a priority level in the multi-priority queue will be selected for processing in accordance with a first-in first-out approach.

17. The computer program product as claimed in claim 14, wherein each of the priority levels in the multi-priority queue include a count associated therewith relating to an amount of pending I/O requests to be processed before moving to a next priority level in the multi-priority queue.

18. The computer program product as claimed in claim 17, wherein a count associated with a priority level in the multi-priority queue is higher relative to a count associated with another priority level in the multi-priority queue with a lower level of servicing.

* * * * *